United States Patent [19]
Cottin et al.

[11] 4,028,531
[45] June 7, 1977

[54] SYSTEM FOR DISPLAYING INFORMATION ABOARD A MOVING OBJECT

[75] Inventors: Jean Cottin; Jean Laxague, both of Paris, France

[73] Assignee: Thomson-CSF, Paris, France

[22] Filed: Nov. 20, 1975

[21] Appl. No.: 633,865

[30] Foreign Application Priority Data

Nov. 21, 1974 France .............................. 74.38280

[52] U.S. Cl. ......................... 236/150.2; 235/150.27; 246/122 R; 340/24

[51] Int. Cl.² .................. G06F 15/20; G09B 29/10

[58] Field of Search ..... 235/150.2, 150.24, 150.27; 340/23, 24; 246/122 R, 122 A, 124

[56] References Cited
UNITED STATES PATENTS

| | | | |
|---|---|---|---|
| 2,363,416 | 11/1944 | Henroteau | 246/124 |
| 2,434,041 | 1/1948 | Hesser | 246/124 |
| 2,535,162 | 12/1950 | Rodgers | 246/122 R X |
| 2,916,613 | 12/1959 | Albrighton et al. | 246/122 R |
| 3,004,258 | 10/1961 | Cohen et al. | 246/122 R X |
| 3,646,580 | 2/1972 | Fuller et al. | 340/24 X |
| 3,886,515 | 5/1975 | Cottin et al. | 235/150.2 X |
| 3,899,769 | 8/1975 | Honore et al. | 340/24 |

*Primary Examiner*—Jerry Smith
*Attorney, Agent, or Firm*—Karl F. Ross; Herbert Dubno

[57] ABSTRACT

A plurality of vehicles which move along a route with predetermined transit points are equipped each with a display device on which the transit points as well as the termini of the route are visualized by lights. These lights are generally turned off except for the light corresponding to a transit point towards which the vehicle is heading which is lit so as to indicate that point to the passengers. The operation of the device is based upon a comparison of the distance traveled by the vehicle from a starting terminus with successively fixed distances which characterize the transit points.

12 Claims, 9 Drawing Figures

SYSTEM FOR DISPLAYING INFORMATION ABOARD A MOVING OBJECT

BACKGROUND OF THE INVENTION

The present invention relates to a system for displaying information on board moving objects such as vehicles which have to pass through specific points in the course of their travel.

Such a system enables an indication to be given of the point at which the moving object is to arrive after leaving the previous point, these indications continuing until the moving object has reached its destination. In this way the position of the moving object along its path of travel can be determined from a knowledge of the specific transit points through which it has to pass.

A particularly advantageous and useful application of the system may be found in the context of a public-transport network, where passengers aboard a vehicle often experience difficulty in finding out where they are and where they are going to.

To help overcome difficulties of this nature, the vehicles carry a map of their assigned route on which are marked specific points which they have to pass, i.e. the stops at which passengers may board and alight. Such a map, although of assistance to the passenger, is not by itself sufficient to solve all the problems which the passenger encounters in ascertaining, even approximately, the position of the vehicle in which he is traveling in relation to the nearest stop if he has not first located on that map the last stop at which the vehicle called.

OBJECT OF THE INVENTION

Thus, the object of our present invention is to provide a system for displaying more detailed information aboard a moving object, in particular a public-transport vehicle, regarding its current position and heading.

SUMMARY OF THE INVENTION

We realize this object, in accordance with the present invention, by the provision of memory means for storing numerical data corresponding to the lengths of route sections extending between a starting point or first stop, a plurality of transit points or intermediate stops and a terminal point or last stop, together with odometric means for continuously registering the distance traveled from the starting point or from some other reference point along the route. The vehicle carries display means for visually indicating to its occupants the current position thereof with reference to the aforementioned points, the display means including a plurality of markers such as signal lamps individually assigned to these points. A comparator, having a first input coupled to the memory means and a second input coupled to the odometric means, generates a control signal when the data on these inputs match each other; the coupling to the odometric means may include signaling means in the form of radio transmitters and receivers if the memory means and the comparator are located at a central station rather than on the vehicle itself. A sequencer, which together with the comparator may form part of a computer located at the aforementioned central station, calls forth from the memory means the data relating to the lengths of successive route sections to be traveled, the sequencer responding to the control signal from the comparator to switch over to the data for the next route section whenever a transit point is reached. This control signal also activates, in the display means, the marker indicating a point at the end of the route section to be traveled next.

BRIEF DESCRIPTION OF THE DRAWING

The above and other features of the invention will become apparent during the course of the ensuing description of a representative embodiment of our improved information-displaying system, given with reference to the accompanying drawing in which.

DESCRIPTION OF PRIOR ART

Our improved system for displaying information aboard moving objects meets a need which is constantly increasing and which goes hand in hand with the requirement for an accelerated expansion in public transport, especially in urban areas. Efforts in this direction have been made which consist in announcing over a loudspeaker the place at which the moving object is about to arrive. This, however, is not entirely satisfactory and the passenger often either does not hear or does not understand the information given. It is therefore considered preferable to provide this information in visual form.

Systems based on a knowledge of the location of a moving object along its path of travel have already been devised, both in cases where the moving object is part of a public railway transport system and where it is part of a transport system using other vehicles, in particular buses in built-up areas. However, the display of the position of the vehicles takes place in these instances at a central station at which all sorts of information arrives relating both to the vehicles themselves and to the conditions prevailing in their locality at any particular time. On the basis of this information, the central station draws an overall situation map for the transport network which it has under its control. From this information the positions of all the operating vehicles along their prospective routes can be determined.

It is also known (see our commonly assigned prior U.S. Pat. No. 3,886,515) to display such information at bus stops for the benefit of the would be passengers.

SPECIFIC DESCRIPTION

The system according to our present invention serves the occupants of moving vehicles especially public-transport passengers, to know the position of the vehicles, in order to help them alight at the correct stop and to enhance the flexibility of the service.

Inside the vehicle, or in any of several vehicles coupled together, we provide a map which gives a reproduction of any desired type, possibly a decorative one, of the outline of the route followed by the vehicle. The route shows the stations through which the vehicles serving the said route are obliged to pass, these stops being marked by indicator lights which, when lit, attract the attention of the occupants of the vehicle.

Figure 1:
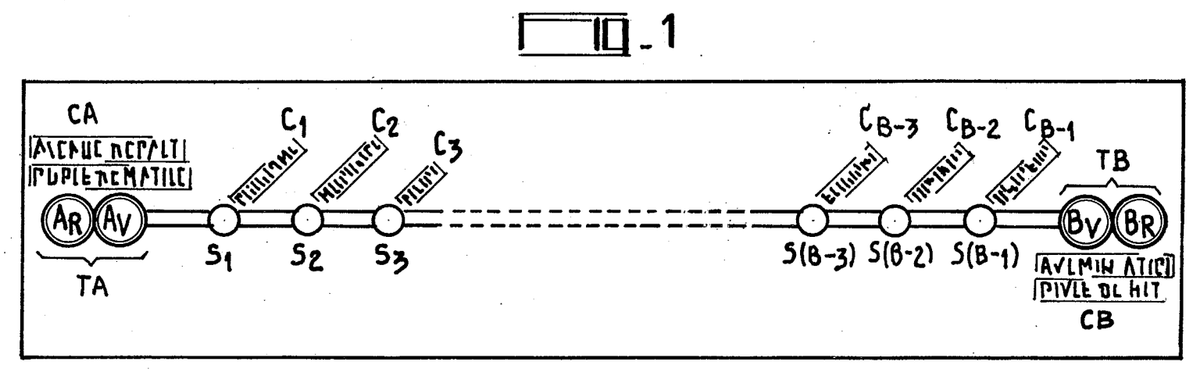
FIG. 1 illustrates a display panel with a map of a single route.

FIG. 1 is a schematic view of the outline of a single route which extends between two terminals marked TA and TB. Between these two points there are situated points marked S1, S2, S3, . . . S(B-3), S(B-2), S(B-1) representing the intermediate stops or stations along the route. Adjacent each of the stops are shown the names by which they are known, in any suitable fashion. The names may for example appear in boxes, as indicated diagrammatically in the drawing at C1, C2, etc. Each of the points so defined has associated with it a light of specific color, and color to be lit in a manner which will be explained hereinafter.

In normal operation, the light (e.g. a red lamp) indicating the terminal point or last stop is permanently lit. Furthermore, on departure from a terminus, the light for the next stop, which may be in green for example, is turned on. This light remains on for the whole of the run to the stop so designated and goes out only when the vehicle reaches this stop. The extinction of the light for the stop reached is automatically accompanied by the illumination of the light for the next stop at which the vehicle is to call. This process takes place all along the route as far as the terminus TB. This terminus has, in addition to the continuously lit red light BR, a green light BV which, when lit, indicates that the next stop is that terminus. The same process takes place in both directions, i.e. form TA to TB and from TB to TA. Then, terminus TA is shown provided on the map with red and green lamps AR and AV.

Figure 2:
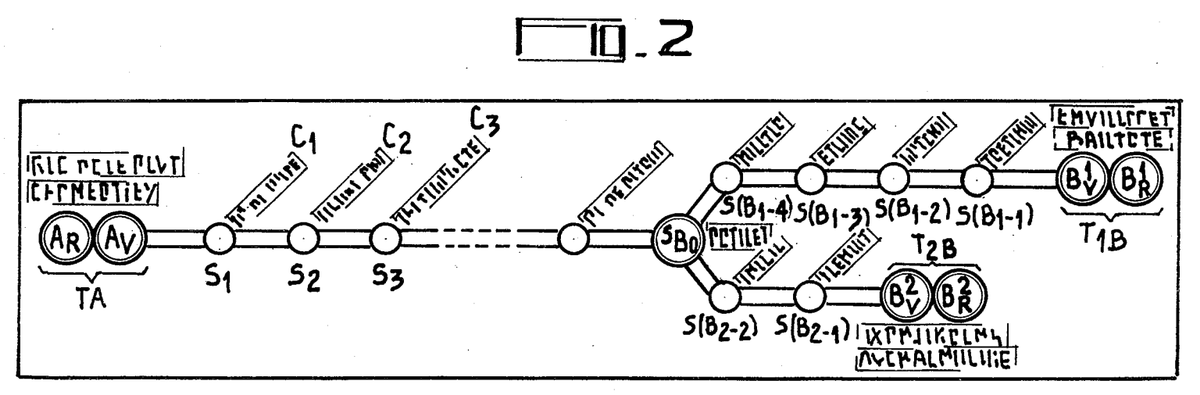
FIG. 2 illustrates another display panel with a map of a route which has more than one terminal stop.

FIG. 2 is a view, also schematic, of the outline of a route which splits at an intermediate stop S(BO) into a pair of branch lines leading to two termini T1B and T2B equipped with lamps B1V, B1R and B2V, B2R. One of the two red lamps B1R, B2R is manually lit by an operator at the start to indicate which of the possible termini is the destination.

Figure 3:
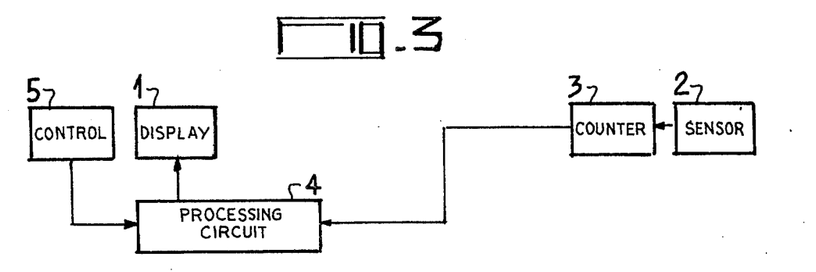
FIG. 3 is a schematic overall view of a system embodying our invention.

FIG. 3 shows in diagrammatic form the general layout of the system according to our invention. This system includes, in addition to a display device 1 embodiments of which are shown in FIGS. 1 and 2, an odometric device 2 sensing the revolutions of the vehicles's wheels. This device feeds a counter 3 which provides information on the distance traveled by the vehicle from a point which is selected as an origin, e.g. the first stop or point of departure on the route in question. The counter supplies a transmission and processing circuit 4 connected to the display device 1 to which it transmits orders for the lights on that device to be turned on and off. A control box 5 for the use of an operator or the driver is connected to circuit 4 to which it transmits data desired to be set manually such as the aforedescribed selective lighting of lamps B1R, B2R (FIG. 2).

The operation of the system is as follows, being based chiefly on a comparison between the distance covered by the vehicle following its departure from a starting point (TA or TB, for example) with the fixed, and therefore predetermined, distances to the various intermediate stops which lie along the route of the vehicle. When the distance traveled is the same as the fixed distance to a stop, which is registered in circuit 4 and was measured from the same origin as the distance traveled, the vehicle is presumed to be at the stop concerned. This coincidence causes a certain number of operations to take place in processing circuit 4, the results of which are transmitted to the display device 1 in the form of commands to turn off the green light for the stop which the vehicle has reached and to turn on the green light for the next stop, at least in the general case. When the last stop of the route is reached, a command will be given to turn off the red light, BR for example, associated with the terminus and similarly to turn off the associated green light BV whose operation had indicated that the next stop was the terminus.

Figure 4:
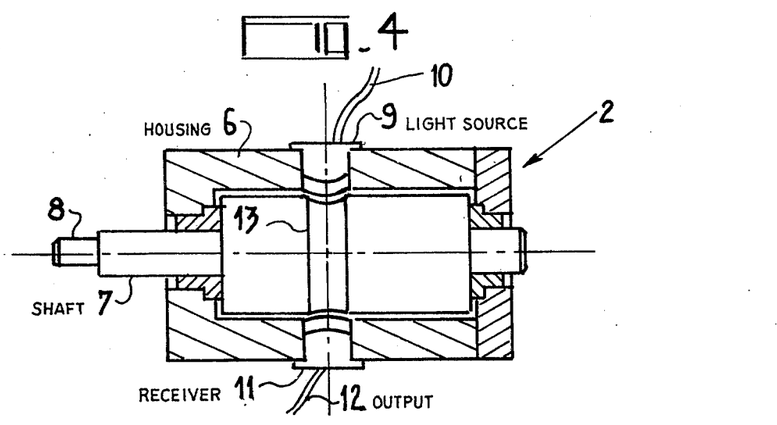
FIG. 4 shows, in cross-sectional view, an odometric device for sensing wheel revolutions.

FIG. 4 shows an embodiment of a device 2 for sensing wheel revolutions which is mounted aboard the vehicle. The sensor is a revolution counter which is connected mechanically to the wheels as they revolve and electrically to the counter 3 of FIG. 3, which also acts as an encoder.

The sensor 2 comprises principally a housing 6, attached to the vehicle, and surrounds the shaft 7 of a wheel, the shaft being rotatable and having a squared driving end 8. The shaft 7 could also be the output shaft of the gear box which drives the differential or any other component which provides an output proportional to vehicle movement. On the axis of the housing, perpendicular to the wheel shaft 7, there is disposed a light source 9 with its power supply 10. This source may be an electroluminescent diode. Opposite the source on the other side of the wheel shaft is a receiver 11, which may be a phototransistor and which has an output lead 12. A hole 13 formed in the shaft 7 perpendicularly to its axis allows the light from the source to reach receiver 11 each time the said shaft turns through half a revolution. Thus, at each half revolution of the shaft, the sensor emits a signal which is fed to the encoding counter 3. The content of the latter thus represents twice the number of revolutions made by the wheels of the vehicle since starting out on the route. Since the number N of pulses registered and the circumference d of the wheel used for counting are known, it is possible to find the distance L covered by the vehicle from the formula $L = Nd/2$. For convenience, the pulse count N may be translated into fractional distances equal to a tenth of the value of $L$. Under these conditions, one counting unit can be made to indicate a distance traveled of 10 meters. Such a computation is easily performed with a dividing element for the counter. If K is a reduction factor such that $N/K = L/10$ in meters, $K = 20/d$ with d in meters. The result is emitted by the counter, for example in binary-coded digital form, and is fed to the processing and transmission circuit 4.

Figure 5:
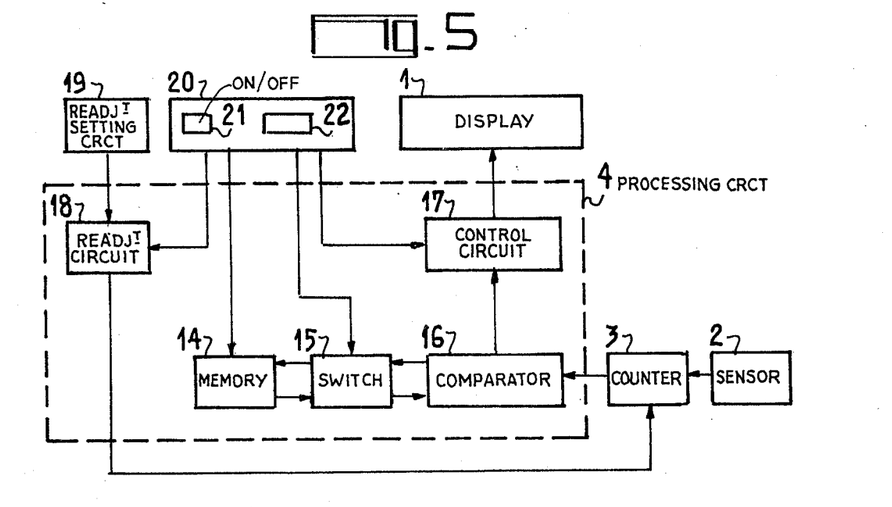
FIG. 5 is a more detailed diagram of the system.

In FIG. 5 we have diagrammatically illustrated the transmission and processing circuit 4 and its connections to the other circuits in the system. Processor 4 contains a memory 14 in which are stored, at predetermined addresses, values for the distances to the various stops located along the route or routes which the vehicles may travel, a switching circuit 15, and a comparator 16 which is connected to the counter 3 for counting the revolutions of the vehicle's wheels. Between comparator 16 and display device 1 a logical control circuit 17 is inserted. Also present in processor 4 is a so-called readjusting circuit 18 which is connected to a readjustment-setting circuit 19 to the revolution counter 3 and also to an assembly 20 comprising an on/of button 21 and a route identifier 22; assembly 20 also works into the memory 14.

The mode of operation of processor 4 is as follows.

It is obviously assumed that the circuit is in working condition, that is to say that the on/off switch 21 is set in the "on" position. By means of the route-specifying circuit 22, there are determined the particular conditions which will govern the display of the stops at all points along the vehicle's route and these are translated into electrical language. These conditions are, for example, the route chosen when it is possible for the vehicle to run on different routes, the terminus selected in the case of a branched route, and the direction in which the route is traveled.

The result of these preliminary selections, which may be carried out manually, is to set switch 15 in a position such that it connects memory 14 to comparator 16, which means that the fixed distances to the various stops are made available in step with the vehicle's progress along its route. At the moment of starting out at the beginning of the route, the odometer 2 begins to measure the distance traveled by the vehicle, this distance being converted into a binary digital expression by the counter 3 which is connected to the comparator. When the route is specified by means of assembly 20, the light, (here assumed to be red) indicating the terminal point of the route is lit by the logical control unit 17. This operation also turns on the light which indicates the first stop after the starting point of the route, here assumed to be green, whereby an indication is given to the left-hand input of comparator 16, located on the same side as switch 15, of the distance at which this first stop is located from the origin. When the vehicle arrives at this first stop, the comparator detects that the two distances, namely the fixed distance applicable to the stop and the distance traveled by the vehicle, are the same. This coincidence effects, via control unit 17, the extinction of the previously illuminated green light and the illumination of the green light for the next stop. At the same time, comparator 16 receives at its left-hand input a binary digital value for the distance to the second stop. This process is repeated for the whole of the route traveled as far as the destination terminus.

The same applies in the case of the return journey except that assembly 20 is adjusted to indicate this journey, by turning on the red light indicating the end of the route and also the green light for the stop at which the vehicle will halt after leaving the new starting point. Specifying the return journey in this way resets all the circuits to their initial state even as the wheel-revolution counter 3 is returned to zero. These operations also take place when the on/off switch, which upon the arrival of the vehicle at its first destination had been set to the "off" position, is returned to the "on" position. Thus, the way in which processor 4 operates on the return journey is the same as has been described in the case of the outward journey.

The readjusting circuit 18 and its setting device 19 are used when special action has to be taken to prevent erroneous operation of display device 1. Such actions are generally carried out manually by the driver.

For various reasons, such as road works in the case of an omnibus-type urban transport vehicle, it may happen that the vehicles leaves its normal route for another, unaccustomed route where the fixed data for the intermediate stops either have not been established or else are not available from the memory.

Since such alterations cannot be visualized, the display panel 1 should first of all be switched off, that is to say its lights, which no longer indicate the true state of affairs, are to be extinguished. This momentary suspension of operation is performed by means of the on/off switch 15.

When the vehicle has returned to its normal route, at the first stop reached the driver switches the system on again and also sets on the readjustment-setting device 19 the fixed distance to this stop, which is a constant of the system. This could be another point on the route whose distance from the starting point would be accurately known. This distance information is transmitted to the wheel-revolution counter 3, which must previously have been reset to zero. At the same time, circuit 20 is used to re-identify the route so that the circuits will return to the state in which they should normally have been if their operation had not been interrupted.

The readjusting means 19, 20 may also be used in cases where the vehicle, although it has not left its planned route, has been obliged to perform a number of maneuvers which, whatever their direction, are counted by the wheel revolution sensor as forward motion on the part of the vehicle. If these maneuvers are lengthy or numerous, errors may arise in registering the distances traveled which may falsify the indications given by the display panel 1.

However, if the odometer 2 is fitted with means for discriminating between the directions of vehicle motion and if the counter 3 is reversible, readjustment is unnecessary.

Another situation in which the readjusting means may be used is when the vehicle does not go as far as the terminus of the route and has to make an early turnabout.

Figure 6:
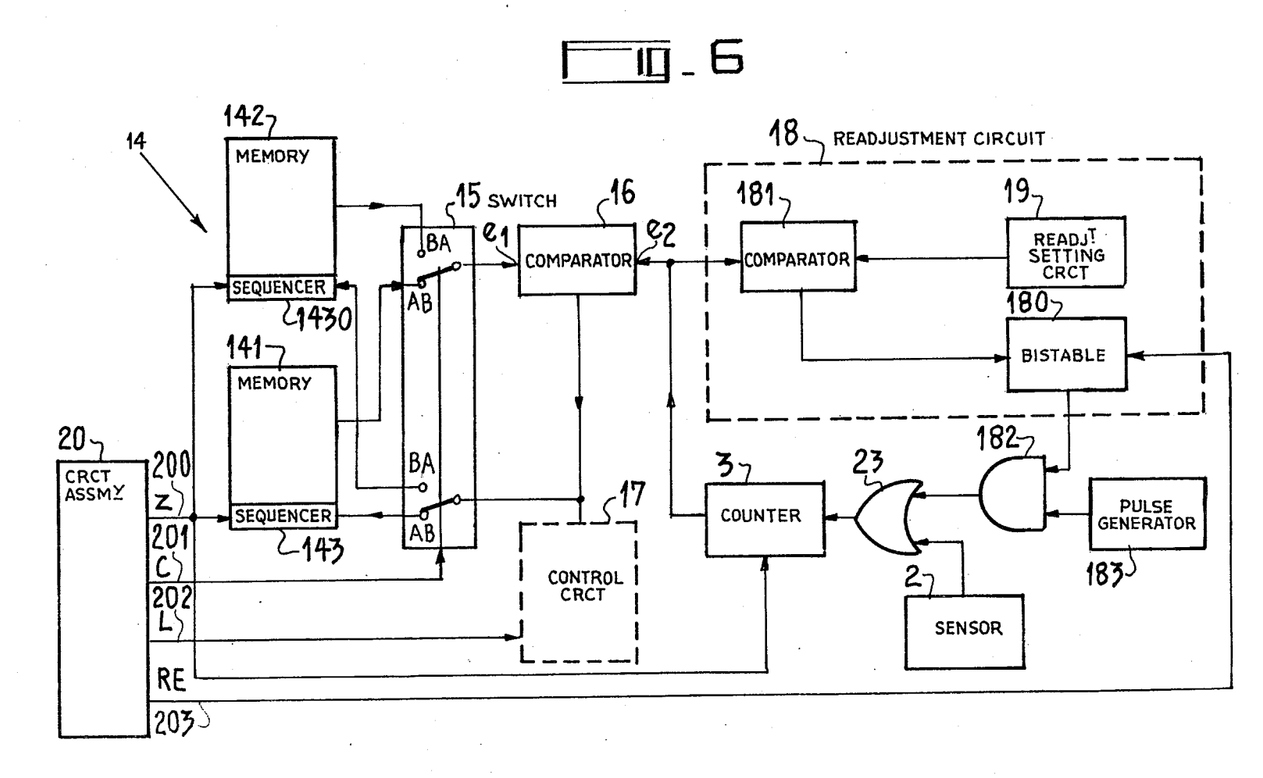
FIG. 6 is a block diagram of part of the system of FIG. 5, showing in particular the control arrangements, the memories and the readjustment device thereof.

FIG. 6 is a more detailed view of certain components of processor 4 described in general terms with reference to FIG. 5.

In FIG. 6 we have again shown the major circuit blocks already described above, i.e. elements 2, 3 and 14–20. Memory 14 is shown divided into two blocks 141 and 142 assigned to the two directions of travel, i.e. from TA to TB and from TB to TA.

To prepare for the departure of the vehicle from its starting point, there are certain operations which the driver has to perform manually. By operating assembly 20, he establishes the route which is to be followed, that is to say the direction TA to TB or TB to TA (FIG. 1) if it is to be a straightforward course. In the same way, another key would allow a more complicated route — e.g. a branched one as in FIG. 2— to be indicated.

A certain number of conductors extend from assembly 20, and correspond to a variety of actions which are taken before the vehicle actually departs from its starting point.

Conductor 200 (Z) transmits a general zero-reset order to, the memory blocks 141, 142 and the wheel-revolution counter 3.

Conductor 201 (C) transmits to switch 15 an order which depends on the choice of route and which connects in circuit the memory block assigned to the selected direction of travel.

Conductor 202 (L) transmits to control unit 17 an order L for the illumination of the red light BR indicating the last stop and the green light S1 for the first stop which will be reached after departure from the starting point.

In the present instance, this illumination order, acts on a bistable circuit or flip-flop br (FIG. 7) in the logic unit 17, which changes over and causes the destination-indicating light BR of the vehicle to be lit. This light stays on for the whole journey. This illumination order also acts on a flip-flop $ab1$ which, via an OR circuit U1, causes the illumination of the green light indicating the stop marked S1, this stop being the first after the beginning of the route in the case of direction TA to TB.

The memory blocks 141, and 142, which may be of any suitable type, are read out sequentially under the control of a sequencer 143 or 1430. Depending upon the direction of travel, they contain values for the distances separating the successive transit points or intermediate stops which lie along the route, i.e. the lengths of the intervening route sections. The sequencer, whose operation is controlled by comparator 16, causes a transition from the address for the previous stop to that for the next stop and thus feeds the value for the length of the route section about to be traveled, via switch 15, to comparator 16 (input $e1$).

Figure 7:
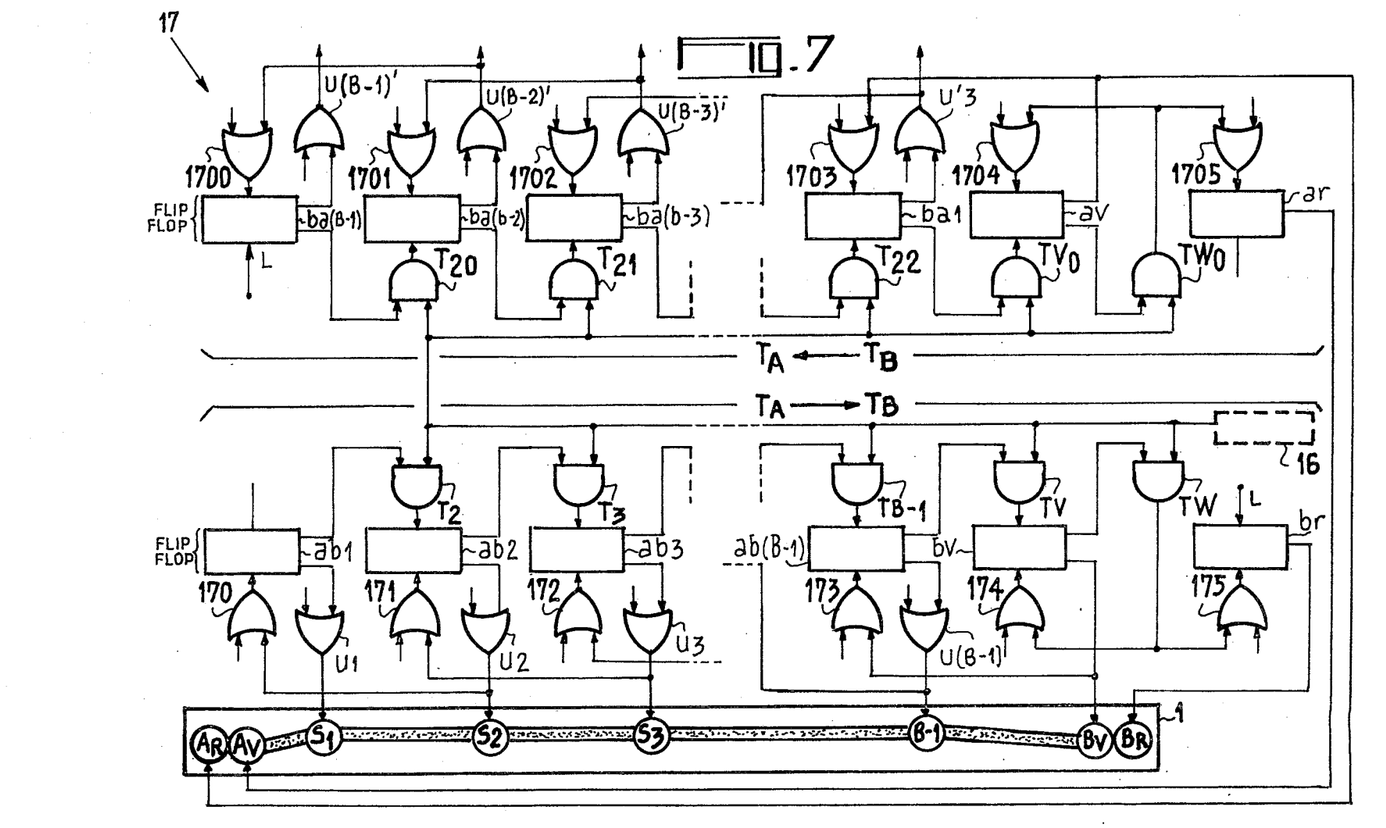
FIG. 7 is a diagram of a logical control unit.

When the vehicle get under way, sensor 2 begins to operate and, via an OR circuit 23 feeds the counter 3 which transmits an indication of the distance traveled to comparator 16 (input $e2$). When the comparator finds that the indications applied to its inputs $e1$ and $e2$ agree, a signal is transmitted on the one hand to the sequencer 143 for memory block 141 (assumed to be used for travel in the direction TA to TB) and on the other hand to control unit 17 where it is applied to one of the inputs of each of a series of AND circuits T2, T3, ... TB-1, TV, and TW. However, only AND circuit T2 is conductive, its other input receiving a signal from the flip-flop $ab1$ which changed over under the effect of the illumination order L actuating the green light for stop S1. A flip-flop $ab2$, connected to AND circuit T2, changes over a signal is transmitted on the one hand to an input of the next AND circuit T3, which remains blocked, and on the other hand, via an OR circuit U2, to the green light for the next station S2, which lights up, and also, via an OR circuit 170, to a resetting input of flip-flop $ab1$, which reverts to its initial state. A logical zero is applied to AND circuit T2 and to OR circuit U1 for the extinquishing the green light of stop S1. As for the signal transmitted to sequencer 143, its effect is to cause read-out of the next item of information recorded in memory half 141, i.e. that for the next stop, namely S2. Input $e1$ of comparator 16 receives the distance information for this stop S2 via switch 15. The control unit 17 repeatedly operates in the manner indicated until the penultimate stop, i.e. S(B-1), is reached.

When the vehicle arrives at this stop, the indications at inputs $e1$ and $e2$ of comparator 16 are the same and a control signal is transmitted on the one hand to sequencer 143, which causes the memory to supply the appropriate distance information for the terminal stop TB, and on the other hand to the AND circuits in the logic control unit 17; AND gate TV, which has voltage applied to one input as a result of changeover of the flip-flop ab(B-1) associated with station S(B-1), becomes conductive. The flip-flop bv which is connected to AND circuit TV changes over and thus causes illumination of the light for the next stop BV, which is in fact the terminus.

The setting of flip-flop bv resets flip-flop ab(B-1) via an OR circuit 173, thus causing the green light for stop S(B-1) to go out. Thus, at this moment both lights for terminus TB are lit, indicating to passengers that the next stop at which the vehicle will arrive is the end of the line. On arrival at the terminus, the fact that the two items of distance information at terminals $e1$ and $e2$ of comparator 16 agree causes a signal to be transmitted to sequencer 143. However, the sequencer does nothing since there is no further information recorded in memory half 141. The signal is also transmitted to AND circuit TW, which becomes conductive since both its inputs have received a logical 1. The output signal from this AND circuit is applied on the one hand to bistable bv, via an OR circuit 174, which is thereby reset and thus causes green light BV to go out, and on the other hand to bistable $br$, via OR circuit 175, which also changes back to its original state and causes extinction of the red light BR indicating the end of the line in the existing direction of travel.

The control unit 17 also includes a second set of circuits indentical with those just described which are brought into action when the vehicle is traveling along its route in the opposite direction, i.e, from TB to TA. The components of this second set include flip-flops $ba$(B-1), $ba$(B-2), ... bal, $av$, $ar$; AND gates T20, T21, ... T22, TVO, TWO, and OR gates U(B-1)', U(B-2)', ... U'3, 1700–1705. There is no need to describe the operation of these circuits in detail, nor that of memory half 142 or the actions which are performed initially by means of assembly 20. It is enough to mention that switch 15 is reversed from position AB to position BA.

In cases where readjustment is necessary, the driver first acts on assembly 20, using the key (forming part of a bank of keys) which, via conductor 203 (RE), brings about a readjusting process which causes bistable circuit 180 to change over and to apply a logical 1 to one of the inputs of an AND circuit 182 whose other input is connected to a pulse generator 183. Also, the driver may set on circuit 19 the distance to a point along his route, possibly a stop, which he knows to be correct. He does this to enable him to switch on his display panel again if it had to be turned off under the conditions which were described above. The setting circuit 19 applies the selected distance information to one input of an ancillary comparator 181 whose other input is connected to the output of the wheel-revolution counter 3 which, as previously mentioned, has first been reset to zero. The output of comparator 181 is connected to bistable circuit 180. When the readjustment operation is to be performed, generator 183 supplies stepping pulses to counter 3 via AND circuit 182, which is now conductive, and OR cirucit 23 in cascade. As long as the output information from the counter is less than the information representing the value registered in circuit 19, the output signal from comparator 181 is zero. Generator 183 continues to feed counter 3. When the readings from circuits 3 and 19 are the same, the output signal from the comparator reverses the bistable circuit 180 and to discontinue the energization of the corresponding input of AND gate 182. The latter is thus blocked and therefore cuts off the supply to counter 3. The count of the latter is now what it would have been if sensor 2 had indicated a distance traveled by the vehicle identical with that registered in readjustment-setting circuit 19. The complete system may thus once again operate in the manner described.

It will be noted that in the foregoing description there were no unusual features about the route chosen. It may occur however, that a number of termini are served from a single route, that is to say that from a given stop there extend several branches which allow different destinations to be reached as shown in FIG. 2. In this case, storage unit 14 may include a switch which, starting from the given stop, allows a changeover to the part of the memory assigned to the selected route. This switch is controlled from circuit assembly 20.

Figure 8:
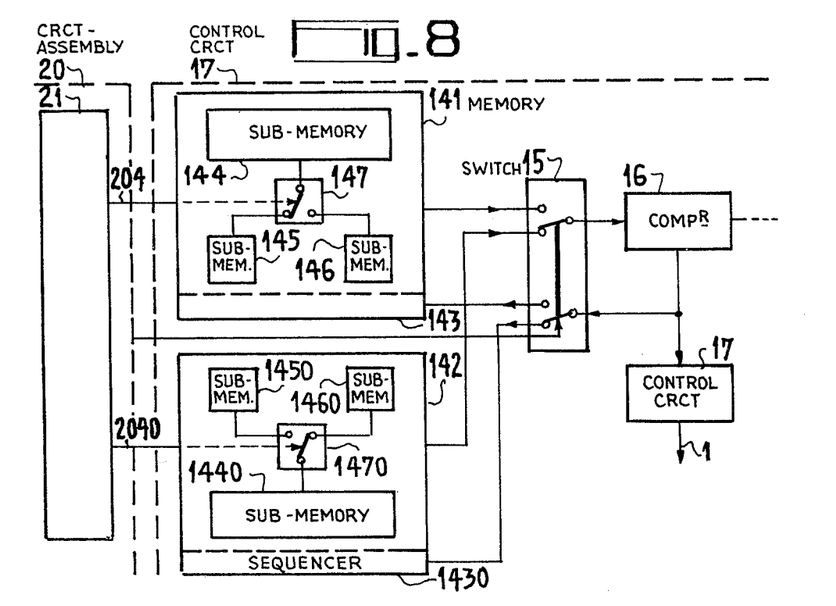
FIG. 8 shows a modified memory arrangement.

FIG. 8 is a schematic illustration of such a circuit arrangement. Memory half 141 contains, in this instance, a sub-memory 144 which corresponds to the common section TA - BO of the route and two other sub-memories 145 and 146 which correspond to the sections BO - T1B and BO - T2B of the route leading to the respective termini. A switch 147, which is operated by means of a conductor 204 from assembly 20, enables an automatic transition to be made via sequencer 143 to the information carried in the selected sub-memory 145 or 146. Memory 142 contains similar circuits for the reverse journey.

Up to now we did not discuss the location of the circuits and assemblies described. It is, however, clear that the display panel 1, the wheel-revolution sensor 2 and the associated counter 3 are disposed aboard the vehicle. The other circuits concerned may be arranged aboard the vehicle or they may equally well be arranged elsewhere.

The embodiment described with reference to FIGS. 1 to 8 may thus form a complete self-contained system which can be installed on any vehicle.

From FIG. 5 it can be seen that certain components, such as the readjusting circuit 18, the memory 14, the switch 15, the comparator 16 and logic unit 17, could be located remote from the vehicle rather than on it. The way in which the system operates does not thereby alter. Thus, if a company operating vehicles equipped with the display device has a centralized automatic control and direction system, these circuits already exist or may easily be built into assemblies existing at the central station.

In this case, each vehicle has on board means for transmitting its own particular data, such as its identity number, the distance which it has traveled, the number of seats which it has available, etc., and means for receiving information which is communicated to it by the central station.

Figure 9:
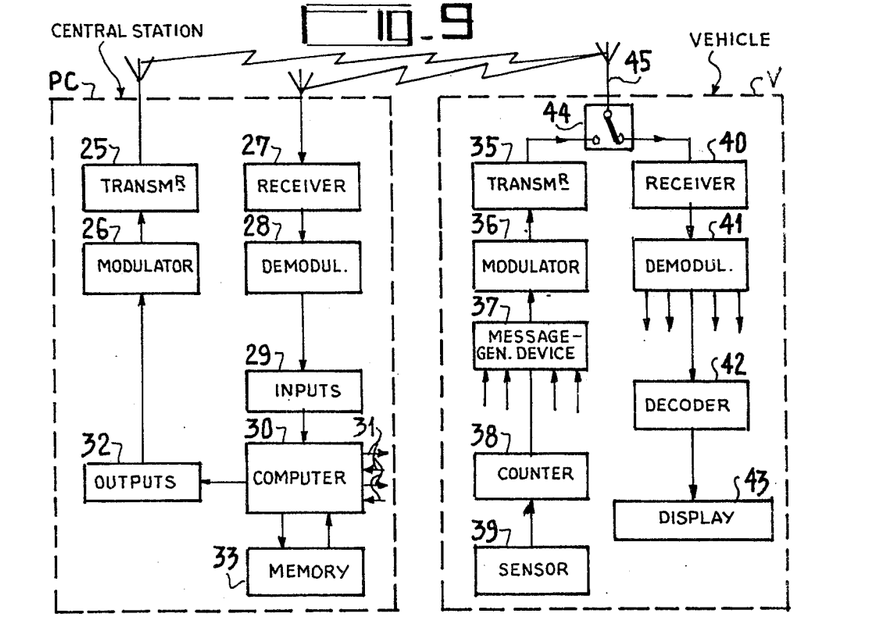
FIG. 9, is a diagram of the system and of an associated central station.

FIG. 9 is a schematic view of the layout of our display system in cases where there is a central station PC. The central station is conventionally provided with a transmitter 25 controlled by a multiplexing modulator 26 which is connected to the outputs 32 of a computer 30. The computer may be connected to peripheral units (not shown) by links 31 and it is also connected to a memory 33. Inputs 29 of the computer are connected to a reception chain including to a demultiplexer and demodulator 28 fed by a receiver 27.

The vehicle V has a conventional receiver/transmitter system which includes, upstream of a transmitter 35, a multiplexing modulator 36 and a message-generating device 37 with a plurality of inputs, one of which is connected to a wheel-revolution counter 38 fed by a wheel-revolution sensor 39. A receiver 40, coupled by a switch 44 to an antenna 45, feeds a demultiplexer and demodulator 41 working into a special decoder 42 which supplies a display panel 43, carrying a map of the route followed by the vehicle as shown in FIGS. 1 and 2.

The components of the system of FIG. 9 are all analogous to those described above so as not to require any detailed explanation. The computer at central station 30 interrogates the vehicle, which replies by giving its position in terms of the distance which it has traveled from its point of departure. This distance is compared at the central station with the distance to the stop towards which the vehicle is heading, as stored in memory 33. The requisite information processing takes place at the central station in the manner already described and the result of processing is transmitted to the vehicle, which receives it, decodes it, and displays it on panel 43 by turning lights on and/or off. Readjustment operations called for from the vehicle, are handled at the central station and then retransmitted to the vehicle.

What is claimed is:

1. A system for giving positional information to passengers aboard a vehicle traveling between a starting point and a terminal point over a route including a plurality of transit points, comprising:
   memory means for storing numerical data corresponding to the lengths of sections of said route extending between said points;
   odometric means on said vehicle for continuously registering the distance traveled from a reference point on said route;
   display means on said vehicle for visually indicating to its occupants the current position of the vehicle with reference to said points, said display means including a plurality of markers individually assigned to said transit and terminal points;
   comparison means provided with first and second inputs respectively coupled to said memory means and to said odometric means for generating a control signal upon the data on said inputs matching each other;
   sequencing means connected to said comparison means for calling forth from said memory means, at said reference point, the stored data relating to the length of the first route section still to be traveled and for thereafter calling forth, in response to control signals emitted by said comparison means, the stored data relating to the lengths of successive route sections for transmission to said first input; and
   circuit means connected between said comparison means and said display means for activating, in response to said control signal, the marker indicatng a point at the end of the route section to be traveled next.

2. A system as defined in claim 1 wherein said transit points are intermediate stops at which passengers may disembark, said display means comprising a map showing said intermediate stops and a last stop representing said terminal point, said markers being positioned adjacent the stops on said map.

3. A system as defined in claim 2 wherein said markers are normally extinguished lights turned on by said circuit means in response to said control signal.

4. A system as defined in claim 3 wherein said map also shows a first stop representing said starting point, said last stop being identified by a permanently illuminated light differing in color from said normally extinguished lights.

5. A system as defined in claim 3 wherein said circuit means comprises a series of flip-flops settable by said control signal and interconnected for resetting of any preceding flip-flop upon the setting of the immediately following flip-flop in the series, said lights being respectively connected to said flip-flop for energization upon a setting thereof.

6. A system as defined in claim 1 wherein said memory means is divided into two halves provided with switch means for selectively coupling either of said halves to said first input in dependence upon the direction of travel of the vehicle along said route.

7. A system as defined in claim 6 wherein said route splits at one transit point into a plurality of branches leading to different terminal points, at least one of said halves being divided into a plurality of submemories each storing the data for the route sections of one of said branches.

8. A system as defined in claim 1 wherein said odometric means comprises a sensor detecting the revolutions of a vehicle wheel, said sensor emitting a predetermined number of counting pulses per revolution, and a pulse counter receiving said pulses from said sensor, said pulse counter being provided with a zero-setting input and with an output connected to said second input.

9. A system as defined in claim 8, futher comprising readjustment means manually operable to modify the reading of said pulse counter.

10. A system as defined in claim 9 wherein said readjustment means comprises a setting circuit adjustable to register a selected count, a ancillary comparator with one input connected to said setting circuit and with another input connected to the output of said pulse counter, and a source of stepping pulses controlled by said ancillary comparator for advancing said pulse counter independently of said sensor until said reading matches said selected count.

11. A system as defined in claim 10 wherein said source comprises a pulse generator, gating means inserted between said generator and said pulse counter, and a bistable circuit connected to said gating means, said bistable circuit being manually switchable for unblocking said gating means and having a reversing input connected to said ancillary comparator for reblocking said gating means upon said selected count being matched by said reading.

12. A system for giving positional information to passengers aboard a vehicle traveling between starting point and a terminal point over a route including a plurality of transit points, comprising:
  a central station;
  memory means at said central station for storing numerical data corresponding to the lengths of sections of said route extending between said points;
  odometric means on said vehicle for continuously registering the distance traveled from a reference point on said route;
  signaling means linking said central station with said vehicle
  display means on said vehicle for visually indicating to its occupants the current position of the vehicle with reference to said points, said display means including a plurality of markers individually assigned to said transit and terminal points;
  computer means provided with first and second inputs respectively coupled to said memory means and via said signaling means to said odometric means for calling forth from said memory means, at the time when said vehicle is located at said reference point, the stored data relating to the length of the first route section still to be traveled by the vehicle and for thereafter calling forth, upon the data on said inputs matching each other, the stored data relating to the lengths of successive route sections for transmission to said first input; and
  circuit means linked via said signaling means with said computer means and connected to said display means for activating, in response to a data match, the marker indicating a point at the end of the route section to be traveled next.

* * * * *